(12) United States Patent
Yang et al.

(10) Patent No.: US 12,256,190 B2
(45) Date of Patent: Mar. 18, 2025

(54) SPEAKER MODULE AND ELECTRONIC DEVICE INCLUDING THE SAME

(71) Applicants: SAMSUNG ELECTRONICS CO., LTD., Suwon-si (KR); GOERTEK INC, Shandong (CN)

(72) Inventors: Seongkwan Yang, Suwon-si (KR); Kiwon Kim, Suwon-si (KR); Choonghyo Park, Suwon-si (KR); Jihoon Song, Suwon-si (KR); Peng Zhang, Shandong (CN); Guodong Zhao, Shandong (CN); Kyudong Kim, Incheon (KR); Byounghee Lee, Suwon-si (KR); Hochul Hwang, Suwon-si (KR)

(73) Assignees: SAMSUNG ELECTRONICS CO., LTD., Suwon-si (KR); GOERTEK INC, Shandong (CN)

( * ) Notice: Subject to any disclaimer, the term of this patent is extended or adjusted under 35 U.S.C. 154(b) by 220 days.

(21) Appl. No.: 17/891,993

(22) Filed: Aug. 19, 2022

(65) Prior Publication Data

US 2022/0394375 A1    Dec. 8, 2022

Related U.S. Application Data

(63) Continuation of application No. PCT/CN2020/076244, filed on Feb. 21, 2020.

(51) Int. Cl.
*H04R 1/28* (2006.01)
*G06F 1/16* (2006.01)

(52) U.S. Cl.
CPC .......... *H04R 1/288* (2013.01); *G06F 1/1633* (2013.01); *H04R 1/2811* (2013.01); *H04R 2499/11* (2013.01)

(58) Field of Classification Search
CPC .. H04R 2499/11; H04R 1/288; H04R 1/2811; G06F 1/1633
See application file for complete search history.

(56) References Cited

U.S. PATENT DOCUMENTS 9,838,765 B1 * 12/2017 Li ........................ H04R 1/023
10,015,574 B1    7/2018 Luce et al.
(Continued)

FOREIGN PATENT DOCUMENTS

CN      104754455        7/2015
CN      105142074 A  * 12/2015 ........... G10K 11/002
(Continued)

OTHER PUBLICATIONS

Extended Search Report dated Feb. 24, 2023 in European Patent Application No. 20920295.1.
(Continued)

*Primary Examiner* — Jeremy A Luks
(74) *Attorney, Agent, or Firm* — Nixon & Vanderhye, P.C.

(57) ABSTRACT

An example speaker module includes a speaker housing including a conduit extending to an internal space; a speaker component positioned in a first area of the internal space adjacent to the conduit; a vent hole spaced apart from the speaker component and passing through at least part of the speaker housing; a sound absorbing material disposed in a second area of the internal space to be positioned adjacent to the speaker component to absorb a sound generated from the speaker component; and a guide structure disposed to surround the vent hole and including at least one protrusion protruding towards the internal space.

14 Claims, 10 Drawing Sheets

(56) References Cited

U.S. PATENT DOCUMENTS

| | | |
|---|---|---|
| 10,171,896 B2 | 1/2019 | Seo |
| 2016/0345090 A1 | 11/2016 | Wilk et al. |
| 2017/0006715 A1 | 1/2017 | Choi et al. |
| 2017/0064438 A1 | 3/2017 | Wilk et al. |
| 2017/0208386 A1 | 7/2017 | Yang et al. |
| 2017/0353785 A1 | 12/2017 | Choi et al. |
| 2018/0124502 A1 | 5/2018 | Liu et al. |
| 2018/0132020 A1* | 5/2018 | Seo .................. H04M 1/18 |
| 2018/0132035 A1* | 5/2018 | Cao .................. H04R 1/2803 |
| 2018/0220228 A1 | 8/2018 | Oishi |
| 2019/0253789 A1 | 8/2019 | Cao et al. |
| 2019/0268691 A1 | 8/2019 | Wilk et al. |

FOREIGN PATENT DOCUMENTS

| | | | | |
|---|---|---|---|---|
| CN | 206433156 U | * | 8/2017 | |
| CN | 207039886 U | * | 2/2018 | |
| CN | 108235195 A | * | 6/2018 | ............. H04R 1/023 |
| CN | 108235198 A | * | 6/2018 | ............. H04R 1/021 |
| CN | 108462906 | | 8/2018 | |
| CN | 108462918 | | 8/2018 | |
| CN | 207835803 U | * | 9/2018 | ............. H04R 1/021 |
| CN | 109819373 | | 5/2019 | |
| CN | 209283504 | | 8/2019 | |
| CN | 110324757 | | 10/2019 | |
| KR | 10-1756673 | | 7/2017 | |
| KR | 10-2018-0052291 | | 5/2018 | |
| WO | 2019/179201 | | 9/2019 | |

OTHER PUBLICATIONS

International Search Report for PCT/CN2020/076244 dated Nov. 30, 2020, 3 pages.
Written Opinion of the ISA for PCT/CN2020/076244 dated Nov. 30, 2020, 3 pages.
Office Action dated Jan. 30, 2024 in counterpart KR Application No. 10-2020-7005329 and English-language translation.
Office Action dated Aug. 22, 2024 in Chinese Patent Application No. 202080097361.6 and English-language translation.
Office Action dated Apr. 10, 2024 in Chinese Patent Application No. 202080097361.6 and English-language translation.

\* cited by examiner

SPEAKER MODULE AND ELECTRONIC DEVICE INCLUDING THE SAME

CROSS-REFERENCE TO RELATED APPLICATIONS

This application is a continuation of International Application No. PCT/CN2020/076244, designating the United States, filed on Feb. 21, 2020, the disclosure of which is incorporated by reference herein in its entirety.

BACKGROUND

Field

The disclosure relates to a speaker module and an electronic device including the speaker module.

Description of Related Art

Electronic devices may output stored information as voice or images. As electronic devices have become highly integrated, and high-speed, high-volume wireless communication has become commonplace, electronic devices, such as mobile communication terminals, are equipped with various functions. For example, an electronic device comes with integrated functionalities, including an entertainment function, such as playing video games, a multimedia function, such as replaying music/videos, a communication and security function for mobile banking, and a scheduling or e-wallet function.

Electronic devices have become lighter, slimmer, and more compact, while providing more functions, meeting customers' needs. Among a variety of functions of an electronic device, some originate from an audio module. The audio module (e.g., a speaker and/or microphone) may transmit/receive voice signals related to the electronic device, to/from the outside of the electronic device, or to/from the user.

A speaker module may include a speaker component, a vent hole, and a sound absorbing material for adjusting the compliance due to a space behind the speaker component and the vibrating plate. Use of a particle-type sound absorbing material may cause a vibration due to the dynamic movement of the particles around the vent hole of the speaker module, with the result of noise. The noise may deteriorate speaker sound quality.

An additional member, e.g., a sponge, may be adopted for the speaker module for noise canceling purposes, but may cause a cost rise, the need for extra designing efforts, or restrictions on spatial design.

The above information is presented as background information only to assist with an understanding of the disclosure. No determination has been made, and no assertion is made, as to whether any of the above might be applicable as prior art with regard to the disclosure.

SUMMARY

According to an embodiment, a guide structure may be formed around the vent hole of the speaker module. This may lead to noise removal by the sound absorbing material, cost savings, and simplified design and manufacturing process.

In accordance with various embodiments, a speaker module includes a speaker housing including a conduit extending to an internal space, a speaker component positioned in a first area of the internal space adjacent to the conduit, a vent hole spaced apart from the speaker component and passing through at least part of the speaker housing, a sound absorbing material disposed in a second area of the internal space to be positioned adjacent to the speaker component to absorb a sound generated from the speaker component, and a guide structure disposed to surround the vent hole and including at least one protrusion protruding towards the internal space.

In accordance with various embodiments, an electronic device includes a housing including a front plate, a back plate, and a side surface member surrounding a first space between the front plate and the back plate and including a first conduit extending to an outside, a display configured to output a screen via the front plate, a battery disposed between the display and the back plate, a speaker module disposed in the first space and including a second conduit connected with the first conduit, and a printed circuit board disposed adjacent to the speaker module and electrically connected with the speaker module. The speaker module includes a speaker housing forming a second space partitioned from the first space, a speaker component positioned adjacent to the second conduit, in a first area of the second space, a vent hole spaced apart from the speaker component and passing through at least part of the speaker housing to the first space of the housing, a sound absorbing material disposed in a second area of the second space to be positioned adjacent to the speaker component to absorb a sound generated from the speaker component, and a guide structure disposed to at least partially surround the vent hole and including at least one protrusion protruding towards the second space.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
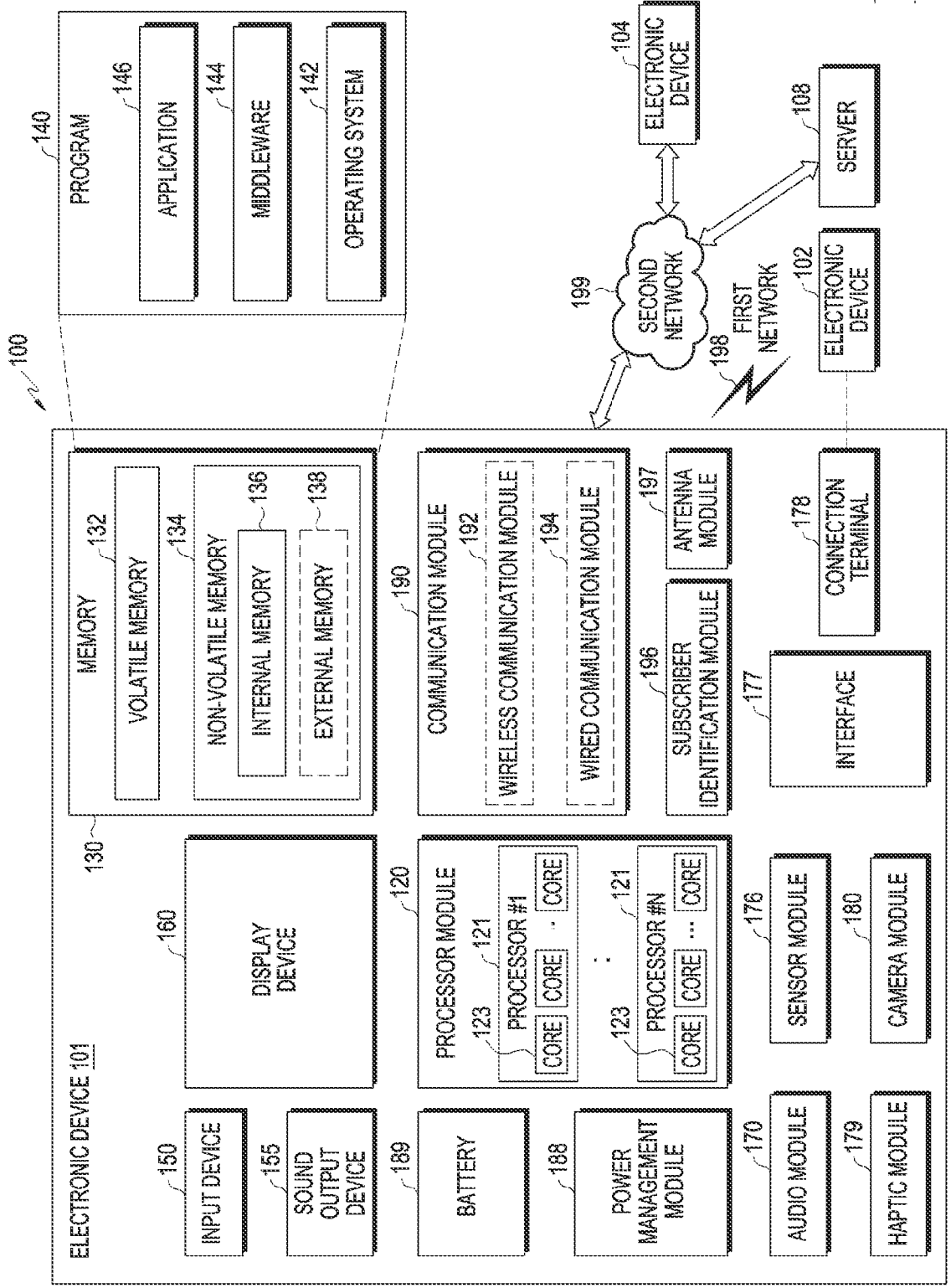
FIG. 1 is a block diagram illustrating an example electronic device in a network environment according various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of or including a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may, for example, refer to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
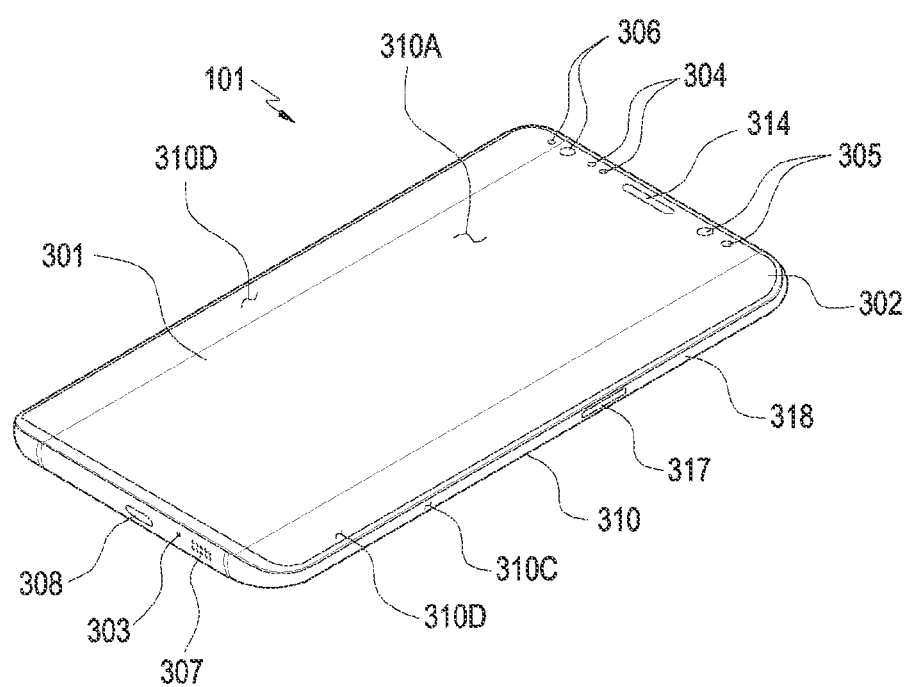
FIG. 2 is a front perspective view illustrating an example electronic device according to various embodiments.
Figure 3:
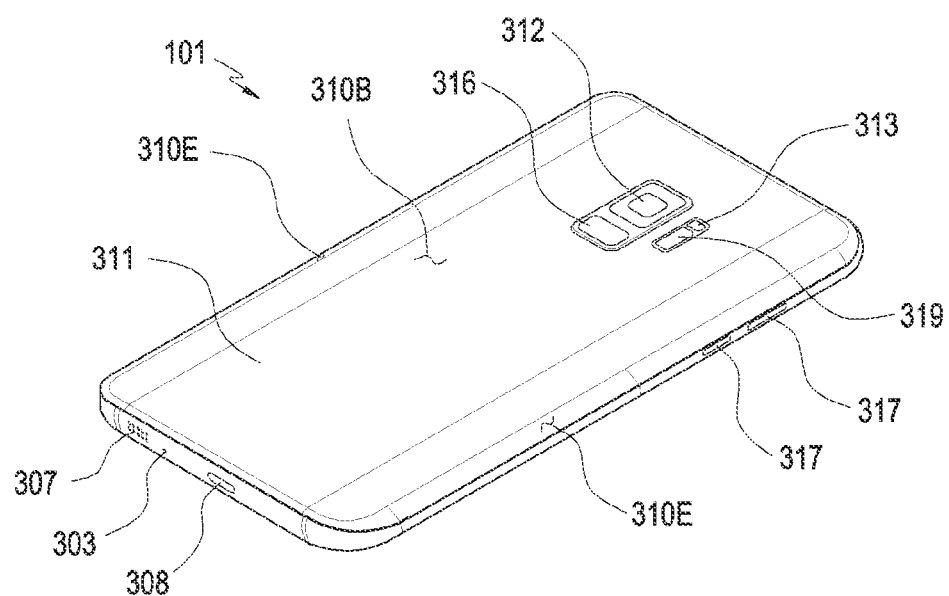
FIG. 3 is a rear perspective view illustrating an example electronic device according to various embodiments.

FIG. 2 is a front perspective view illustrating an example electronic device 101 according to various embodiments. FIG. 3 is a rear perspective view illustrating an example electronic device 101 according to various embodiments.

Referring to FIGS. 2 and 3, according to an embodiment, an electronic device 101 may include a housing 310 with a first (or front) surface 310A, a second (or rear) surface 310B, and a side surface 310C surrounding a space between the first surface 310A and the second surface 310B. According to an embodiment (not shown), the housing may denote a structure forming part of the first surface 310A, the second surface 310B, and the side surface 310C of FIG. 3. According to an embodiment, at least part of the first surface 310A may have a substantially transparent front plate 302 (e.g., a glass plate or polymer plate). The second surface 310B may be formed of a substantially opaque rear plate 311. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel plate 318 may be integrally formed together and include the same material (e.g., a metal, such as aluminum).

In the embodiment illustrated, the front plate 302 may include two first regions 310D, which seamlessly and bendingly extend from the first surface 310A to the rear plate 311, on both the long edges of the front plate 302. In the embodiment (refer to FIG. 3) illustrated, the rear plate 311 may include second regions 310E, which seamlessly and bendingly extend from the second surface 310B to the front plate, on both the long edges. According to an embodiment, the front plate 302 (or the rear plate 311) may include only one of the first regions 310D (or the second regions 310E). Alternatively, the first regions 310D or the second regions 301E may partially be excluded. According to an embodiment, in a side view of the electronic device 101, the side bezel structure 318 may have a first thickness (or width) for sides that do not have the first regions 310D or the second regions 310E and a second thickness, which is smaller than the first thickness, for sides that have the first regions 310D or the second regions 310E.

According to an embodiment, the electronic device 101 may include at least one or more of a display 301, audio modules 303, 307, and 314, sensor modules 304, 316, and 319, camera modules 305, 312, and 313, key input devices 317, a light emitting device 306, and connector holes 308. According to an embodiment, the electronic device 101 may exclude at least one (e.g., the key input device 317 or the light emitting device 306) of the components or may add other components.

According to an embodiment, the display 301 may be visually exposed through, e.g., a majority portion of the front plate 302. According to an embodiment, at least a portion of the display 301 may be exposed through the front plate 302 forming the first surface 310A and the first regions 310D of the side surface 310C. According to an embodiment, the edge of the display 301 may be formed to be substantially the same in shape as an adjacent outer edge of the front plate 302. According to an embodiment (not shown), the interval between the outer edge of the display 301 and the outer edge of the front plate 302 may remain substantially even to give a larger area of exposure the display 301.

According to an embodiment (not shown), the screen display region of the display 301 may have a recess or opening in a portion thereof, and at least one or more of the audio module 314, sensor module 304, camera module 305, and light emitting device 306 may be aligned with the recess or opening. According to an embodiment (not shown), at least one or more of the audio module 314, sensor module 304, camera module 305, fingerprint sensor 316, and light emitting device 306 may be included on the rear surface of the screen display region of the display 301. According to an embodiment (not shown), the display 301 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 304 and 319 and/or at least part of the key input device 317 may be disposed in the first regions 310D and/or the second regions 310E.

According to an embodiment, the audio modules 303, 307, and 314 may include, e.g., a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. According to an embodiment, the speaker holes 307 and 314 and the microphone hole 303 may be implemented as a single hole, or speakers may be included without the speaker holes 307 and 314 (e.g., piezo speakers). The audio modules 303, 307, and 314 are not limited to the above-described structure. Depending on the structure of the electronic device 101, various design changes may be made—e.g., only some of the audio modules may be mounted, or a new audio module may be added.

According to an embodiment, the sensor modules 304, 316, and 319 may generate an electrical signal or data value corresponding to an internal operating state or external environmental state of the electronic device 101. The sensor modules 304, 316, and 319 may include a first sensor module 304 (e.g., a proximity sensor) and/or a second sensor module (not shown) (e.g., a fingerprint sensor) disposed on the first surface 310A of the housing 310 and/or a third sensor module 319 (e.g., a heart-rate monitor (HRM) sensor) and/or a fourth sensor module 316 (e.g., a fingerprint sensor) disposed on the second surface 310B of the housing 310. The fingerprint sensor may be disposed on the second surface 310B as well as on the first surface 310A (e.g., the display 301) of the housing 310. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304. The sensor modules 304, 316, and 319 are not limited to the above-described structure. Depending on the structure of the electronic device 101, various design changes may be made—e.g., only some of the sensor modules may be mounted, or a new sensor module may be added.

According to an embodiment, the camera modules 305, 312, and 313 may include a first camera device 305 disposed on the first surface 310A of the electronic device 101, and a second camera device 312 and/or a flash 313 disposed on the second surface 310B. The camera modules 305 and 312 may include one or more lenses, an image sensor, and/or an image signal processor. The flash 313 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 101. The camera modules 305, 312, and 313 are not limited to the above-described structure. Depending on the structure of the electronic device 101, various design changes may be made—e.g., only some of the camera modules may be mounted, or a new camera module may be added.

According to an embodiment, the key input device 317 may be disposed, e.g., on the side surface 310C of the housing 310. According to an embodiment, the electronic device 101 may exclude all or some of the above-mentioned key input devices 317 and the excluded key input devices 317 may be implemented in other forms, e.g., as soft keys, on the display 301. According to an embodiment, the key input device may include the sensor module 316 disposed on the second surface 310B of the housing 310.

According to an embodiment, the light emitting device 306 may be disposed on, e.g., the first surface 310A of the housing 310. The light emitting device 306 may provide, e.g., information about the state of the electronic device 101 in the form of light. According to an embodiment, the light emitting device 306 may provide a light source that interacts with, e.g., the camera module 305. The light emitting device 306 may include, e.g., a light emitting device (LED), an infrared (IR) LED, or a xenon lamp.

According to an embodiment, the connector holes 308 may include a first connector hole 308 for receiving a connector (e.g., a universal serial bus (USB) connector) for transmitting or receiving power and/or data to/from an external electronic device and/or a second connector hole (e.g., an earphone jack) (not shown) for receiving a connector for transmitting or receiving audio signals to/from the external electronic device. The connector holes 308 are not limited to the above-described structure. Depending on the structure of the electronic device 101, various design changes may be made—e.g., only some of the connector holes may be mounted, or a new connector hole may be added.

Figure 4:
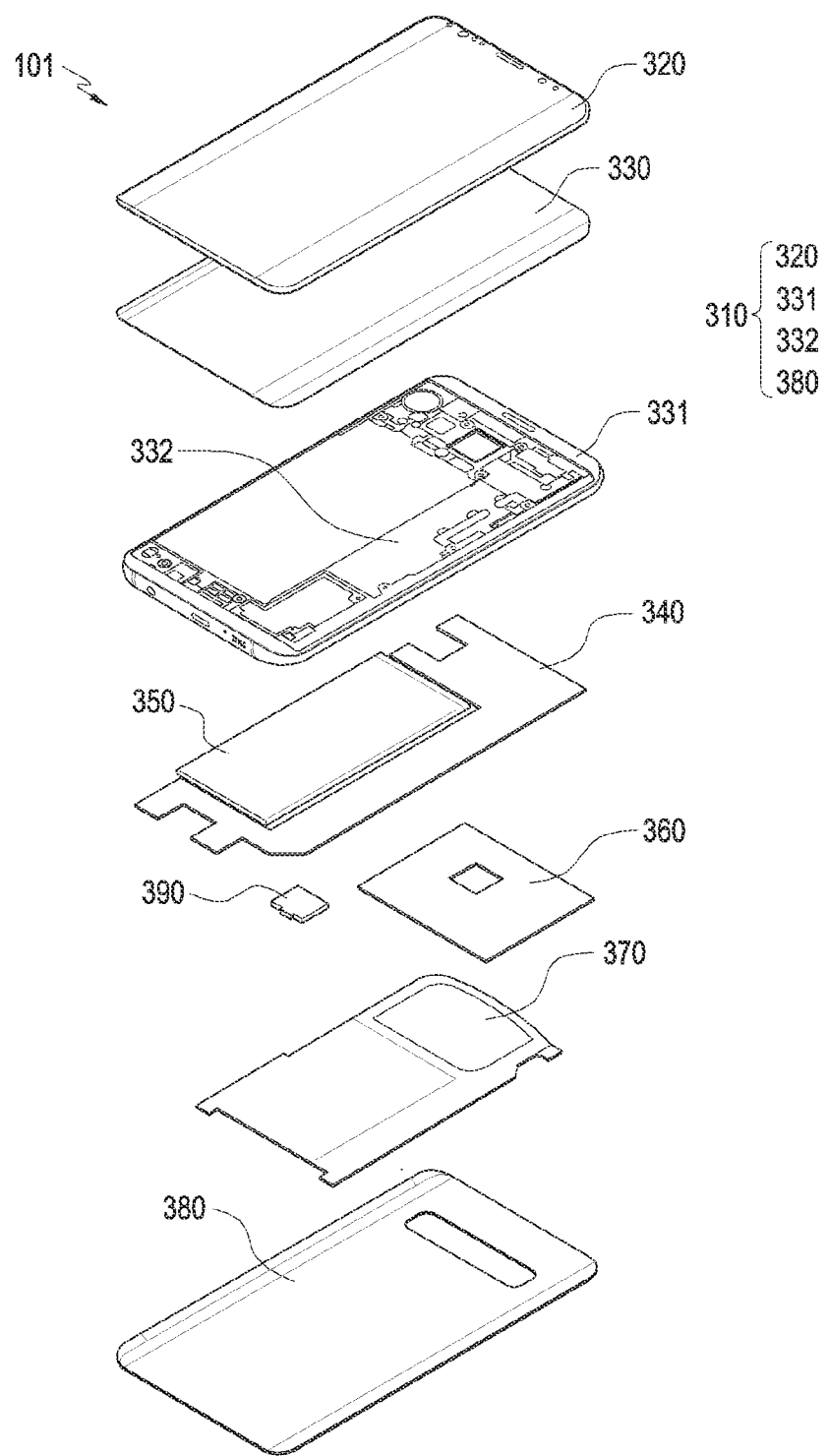
FIG. 4 is an exploded perspective view illustrating an example electronic device according to various embodiments.

FIG. 4 is an exploded perspective view illustrating an example electronic device 101 according to various embodiments.

Referring to FIG. 4, according to an embodiment, an electronic device 101 (e.g., the electronic device 101 of FIGS. 1, 2, and 3) may include a housing 310, a display 330, a printed circuit board 340, a battery 350, an antenna 370, and an audio module 390. According to an embodiment, the housing 310 may include a front plate 320, a side surface member (e.g., a side bezel structure 331 or a first supporting member 332), and a back plate 380. As another example, the electronic device 101 may include a second supporting member 360 (e.g., a rear case). According to an embodiment, the electronic device 101 may exclude at least one (e.g., the first supporting member 332 or the second supporting member 360) of the components or may add other components. At least one of the components of the electronic device 101 may be the same or similar to at least one of the components of the electronic device 101 of FIG. 2 or 3 and no repeated description is provided below.

According to an embodiment, the electronic device 101 may include a bar-shaped mobile device, a foldable mobile device, or a slidable mobile device. For example, the electronic device 101 may include a plurality of housings rotatable on each other or a plurality of housings slidable relative to each other. As another example, the electronic device 101 may include a display 330 (e.g., a flexible display) bendable or rollable with a predetermined curvature. The housing 310 of the electronic device 101 may allow the electronic device to bend, roll, or unfold without damage to the flexible display due to deformation. According to an embodiment, the first supporting member 332 may be disposed inside the electronic device 101 to be connected with the side bezel structure 331 or integrated with the side bezel structure 331. The first supporting member 332 may be formed of or include, e.g., a metal and/or non-metallic material (e.g., polymer). The display 330 may be joined onto one surface of the first supporting member 332, and the printed circuit board 340 may be joined onto the opposite surface of the first supporting member 332. A processor, memory, and/or interface may be mounted on the printed circuit board 340. The processor may include one or more of, e.g., a central processing unit, an application processor, a graphic processing device, an image signal processing, a sensor hub processor, or a communication processor.

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the battery 350 may be a device for supplying power to at least one component of the electronic device 101. The battery 350 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side bezel structure 331 and/or the first supporting member 332.

According to an embodiment of the disclosure, the audio module 390 may convert, e.g., a sound signal into an electrical signal and vice versa. According to an embodiment, as the audio module 390, a microphone for obtaining external sounds may be mounted inside the electronic device 101, or a speaker for outputting sounds to the outside may be mounted inside the electronic device 101. The microphone may obtain sound through a microphone hole (e.g., the microphone hole 303 of FIG. 2A), and the speaker may output sound through a speaker hole (e.g., the speaker hole 307 or 314 of FIG. 2A).

Figure 5:
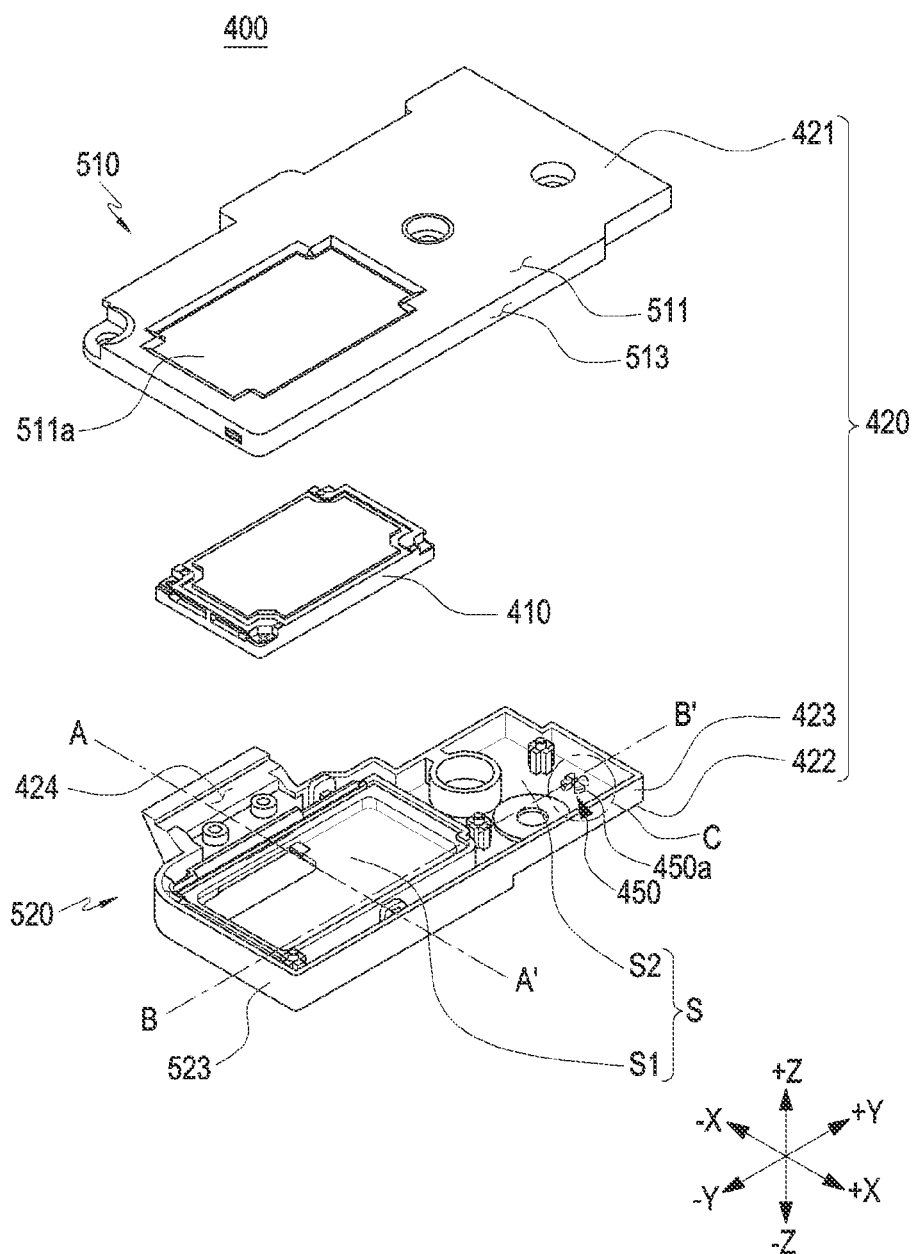
FIG. 5 is an exploded perspective view illustrating a mounting structure of a speaker module formed on one side of an example electronic device according to various embodiments.
Figure 6:
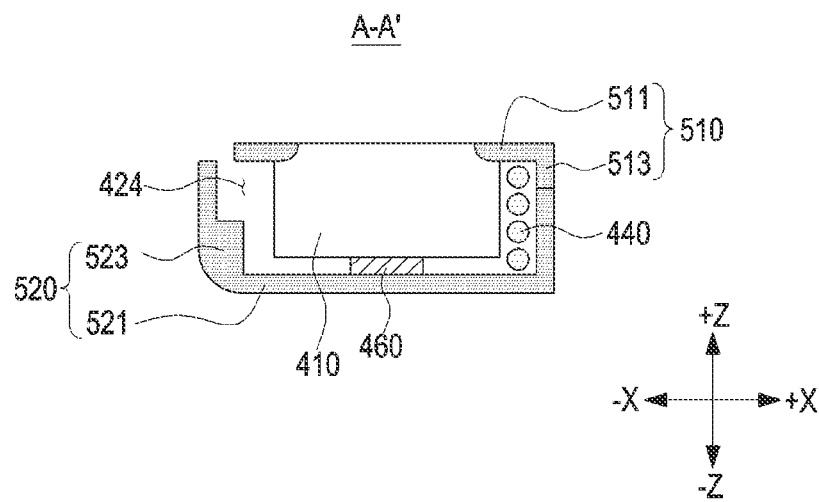
FIG. 6 is a cross-sectional view taken along line A-A' of FIG. 5.
Figure 7:
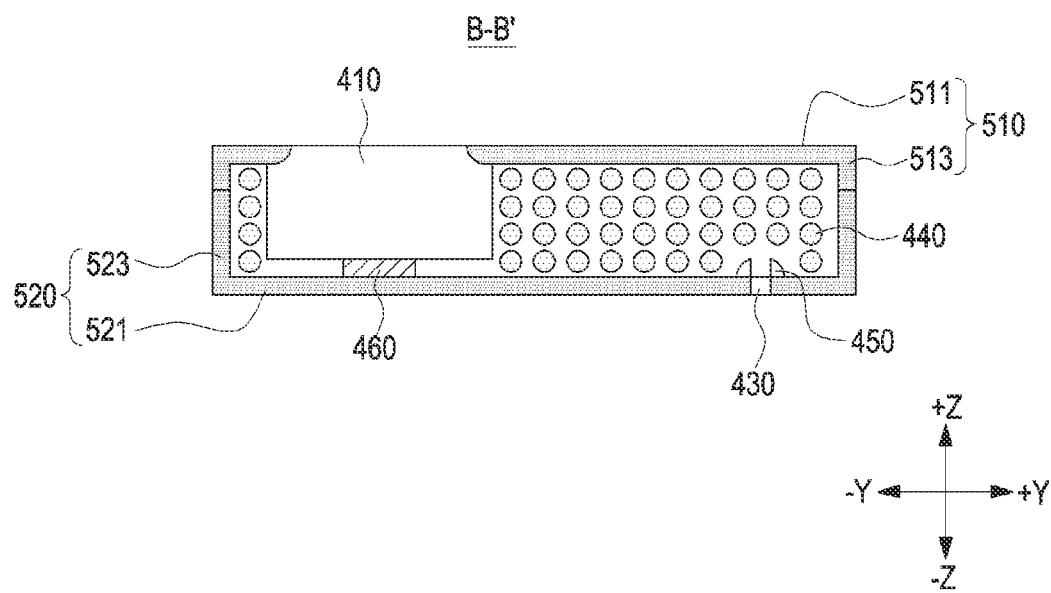
FIG. 7 is a cross-sectional view taken along line B-B' of FIG. 5.

FIG. 5 is an exploded perspective view illustrating a mounting structure of a speaker module formed on one side of an example electronic device according to various embodiments. FIG. 6 is a cross-sectional view taken along line A-A' of FIG. 5. FIG. 7 is a cross-sectional view taken along line B-B' of FIG. 5.

According to an embodiment, an electronic device (e.g., the electronic device 101 of FIGS. 1, 2, 3, and 4) may include a speaker module 400 (e.g., the audio module 390 of FIG. 4) packing various components in its internal space. The speaker module 400 may come in a separate carrier shape including a speaker component 410. As another example, the speaker module 400 may be prepared in such a structure as to shield off the backward sounds from the speaker component, e.g., plates and/or brackets, along with a carrier, included in the housing of the electronic device 101.

According to an embodiment, the speaker module 400 may include a speaker housing 420 including a conduit 424 extending to an internal space S, a speaker component 410 positioned in a first area S1 of the internal space S adjacent to the conduit 424, a vent hole 430 spaced apart from the speaker component and passing through at least part of the speaker housing 420, a sound absorbing material 440 disposed in a second area S2 of the internal space S to be positioned adjacent to the speaker component 410 to absorb a sound generated from the speaker component 410, and a guide structure 450 disposed to surround the vent hole 430 and including at least one protrusion 450a towards the internal space S.

In the three-axis rectangular coordinate system, 'Z' may refer, for example, to the thickness direction of the speaker module 400, 'Y' the lengthwise direction of the speaker module 400, and 'X' the width direction of the speaker module 400. According to an embodiment, 'Z' may refer, for example, to a first direction (a +Z axis direction, hereinafter "+Z") or a second direction (a −Z axis direction, hereinafter "−Z"), 'Y' may refer, for example, to a third direction (a +Y axis direction or a −Y axis direction, hereinafter "+Y" or "−Y"), and 'X' may refer, for example, to a fourth direction (a +X axis direction or a −X axis direction, hereinafter "+X" or "−X").

According to an embodiment, the speaker housing 420 may include a front plate 421 facing in the first direction +Z, a back plate 422 facing in a second direction −Z which is opposite to the first direction +Z, and a side surface plate 423 surrounding an internal space S between the front plate 421 and the back plate 422 and having a conduit 424 extending to the outside. As an example, the speaker housing 420 may include an upper structure 510 including at least one surface facing in the first direction +Z and a lower structure 520 including at least one surface facing in the second direction −Z opposite to the first direction +Z and formed to couple with the upper structure 510.

According to an embodiment, the upper structure 510 may include a front surface 511 facing in the first direction +Z and a first side surface 513 extending from the front surface 511 in the second direction −Z and facing in the third direction +Y or −Y or the fourth direction +X or −X. The front surface 511 may include an opening 511a passing through at least a portion thereof and formed to expose at least a portion of the front surface of the speaker component 410. As an example, to couple with the lower structure 520, the upper structure 510 may provide an area for forming a coupling hole (e.g., a screw hole) or an area formed along the inner side of the upper structure 510 to place a sealing member and/or adhesive member. The sealing member and/or adhesive member disposed in the upper structure 510 and/or lower structure 520 may cut off leakage of sound waves from the internal space S to a path other than a designated section or prevent influx of foreign bodies including fluids. The sealing member may be formed of a sealing or adhesive material via, e.g., a gasket and/or tape.

According to an embodiment, the lower structure 520 may include a back surface 521 facing in the second direction −Z and a second side surface 523 extending from the back surface 521 in the first direction +Z and facing in the third direction +Y or −Y or the fourth direction +X or −X. The thickness of the second side surface 523 may be larger than the thickness of the first side surface 513. The lower structure 520 may have a vent hole 430 for providing an area where most of the speaker component 410 is seated and passing through at least part of the back surface 521. The vent hole 430 may be a structure for air circulation. There may be formed one or more vent holes 430 to release the difference in atmospheric pressure between the inside and outside of the speaker module 400.

According to an embodiment, a conduit 424 extending to the outside of the speaker module 400 may be disposed in an area of the first side surface 513 and/or the second side surface 523. For example, the conduit 424 may connect to the outside of the speaker module 400 via a coupling between the first side surface 513 and the second side surface 523. As an example, the conduit 424 may connect to a through hole formed through the plate and/or bracket included in the housing of the electronic device to the outside of the electronic device 101. The conduit 424 of the speaker module 400 may connect to the through hole of the housing of the electronic device 101, providing for air ventilation to the outside of the electronic device 101 and sound propagation from the speaker component 410 to the outside.

According to an embodiment, the internal space S of the speaker housing 420 may include a first area S1 where the speaker component 410 is seated and a second area S2 formed to at least partially surround the speaker component 410 and providing a resonance space. The first area S1 may be formed corresponding to the shape of the speaker component 410 and connect to the first side surface 513 and/or the second side surface 523 where the conduit 424 is formed. An elastic member 460 may be disposed in the first area S1 to stably support the back surface 521 of the speaker component 410. The sound absorbing material 440 for absorbing sound from the speaker component 410, the vent hole 430 for releasing the atmospheric pressure difference, and the guide structure 450 disposed adjacent to the vent hole 430 may be positioned in the second area S2.

According to an embodiment, the speaker component 410 may be formed substantially in a hexahedral shape and may be disposed so that a vibration plate formed ahead is exposed through the opening 511a of the upper structure 510. The speaker component 410 may include at least one side surface facing in the third direction +Y or −Y or the fourth direction +X or −X. The side surface may be disposed adjacent to the edge of the speaker housing 420 and the housing of the electronic device 101, and the conduit 424 may be formed along the direction in which the side surface faces so as to guide sound propagation.

According to an embodiment, the sound absorbing material 440 may be formed with a plurality of particles and be disposed in the second area S2 to cancel out, by destructive interference, the low-frequency sounds generated from one surface of the speaker component 410. The sound absorbing material 440 may be formed with myriad spherical particles with a designated diameter. The sound absorbing material 440 may be formed of various sound-absorbing materials, such as sponge, cashmere, fiber glass, or wool.

According to an embodiment, the guide structure 450 may be disposed on an inner side surface of the lower structure 520 to surround the vent hole 430. The guide structure 450 may include at least one protrusion 450a towards the internal space S. The at least one protrusion 450a may be formed to maintain the air ventilation of the vent hole 430 without direct contact to the vent hole 430. For example, the guide structure 450 including one protrusion 450a may be shaped as a closed loop formed along the vent hole 430 and may provide an air circulation path that has a designated thickness and has a front opening and/or side opening extending with the vent hole 430. As an example, in the guide structure 450 with a plurality of protrusions 450a, the plurality of protrusions 450a may be disposed apart from each other around the vent hole 430, so that the opening facing the front surface and/or side surface of the vent hole 430 extends with the vent hole 430 to provide an air circulation path. The specific structure of the vent hole 430 and the guide structure 450 is described below with reference to the drawings.

Figure 8:
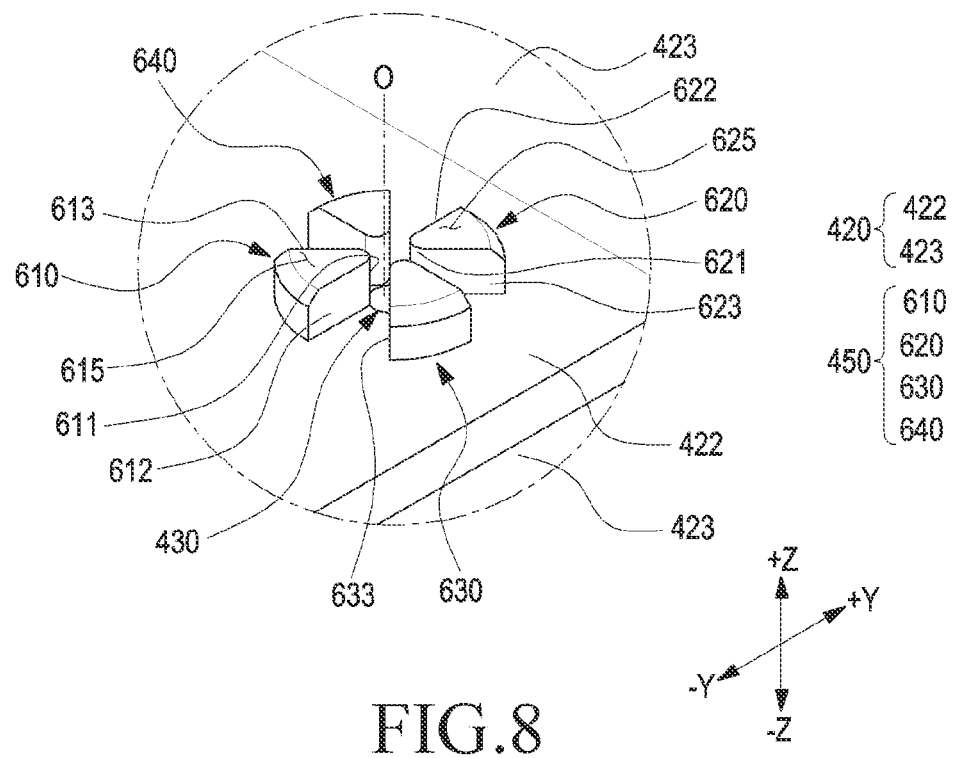
FIG. 8 is a perspective view illustrating a guide structure and vent hole of an example speaker module according to various embodiments.
Figure 9:
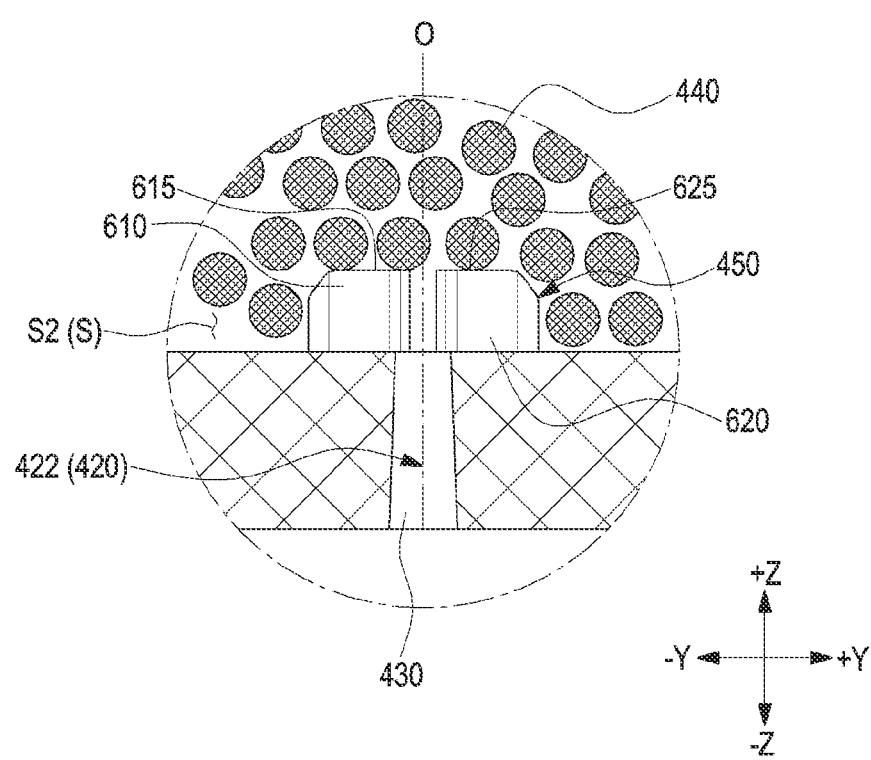
FIG. 9 is a cross-sectional view illustrating a guide structure and vent hole of an example speaker module according to various embodiments.

FIG. 8 is a perspective view illustrating a guide structure and vent hole of an example speaker module according to various embodiments. FIG. 9 is a cross-sectional view illustrating a guide structure and vent hole of an example speaker module according to various embodiments.

FIG. 8 is an enlarged perspective view of area C of FIG. 5.

According to an embodiment, a speaker module (e.g., the speaker module 400 of FIG. 5) may include a speaker housing 420, a speaker component (e.g., the speaker component 410 of FIG. 5) positioned in an internal space S of the speaker housing 420, a vent hole 430 formed through at least a portion of the speaker housing 420, a sound absorbing material 440 for absorbing sound generated from the speaker component 410, and a guide structure 450 at least partially projecting towards the internal space S and disposed to surround the vent hole 430.

The speaker housing 420, speaker component 410, vent hole 430, sound absorbing material 440, and guide structure 450 of the speaker module 400 shown in FIGS. 8 and 9 may be wholly or partially identical in configuration to the speaker housing 420, speaker component 410, vent hole 430, sound absorbing material 440, and guide structure 450 of the speaker module 400 shown in FIGS. 5, 6, and 7.

In the 2-axis rectangular coordinate system of FIGS. 8 and 9, 7 may refer, for example, to the thickness direction of the speaker module 400, and 'Y' may refer, for example, to the lengthwise direction of the speaker module 400. According to an embodiment, 'Z' may refer, for example, to a first direction (a +Z axis direction, hereinafter "+Z") or a second direction (a −Z axis direction, hereinafter "−Z"), and 'Y' may refer, for example, to a third direction (a +Y axis direction or a −Y axis direction, hereinafter "+Y" or "−Y").

According to an embodiment, the vent hole 430 may be formed through a portion of the lower structure (e.g., the lower structure 520 of FIG. 5) of the speaker housing 420. For example, the vent hole 430 may be disposed in the second area partitioned from the first area (e.g., the first area S1 of FIG. 5) where the speaker component 410 is disposed and may be formed through at least a portion of the back plate (e.g., the back plate 422 of FIG. 5) facing in the second direction −Z of the speaker housing 420.

According to an embodiment, the vent hole 430 may include a central axis O and, when viewed from above the back plate 422, the vent hole 430 may look circular. The diameter of the vent hole 430 may gradually increase in the second direction −Z. For example, the vent hole 430 may be shaped as a portion of a cone. However, the shape of the vent hole 430 is not limited thereto. For example, the vent hole 430 may be shaped as a cylinder or to have its diameter gradually decrease along the second direction.

According to an embodiment, there may be provided sound absorbing material 440 of particles in the second area S2 of the speaker housing 420. The diameter of the sound absorbing material 440 particles may be larger than the diameter of the vent hole 430, preventing the sound absorbing material 440 particles from entering the vent hole 430.

Generally, the sound absorbing material 440 may move around the vent hole 430 due to the operation of the speaker component 410. When moving, the sound absorbing material 440 may collide with its adjacent area, causing a noise. The movement of the sound absorbing material 440 may partially block the vent hole 430, interfering with air circulation. According to an embodiment, the guide structure 450 formed around the vent hole 430 may prevent the sound absorbing material 440 from collisions, adjacent to the vent hole 430. Thus, noise may be suppressed. The guide structure 450 formed around the vent hole 430 may allow for stable circulation of the air into the inside of the vent hole 430.

According to an embodiment, the guide structure 450 may include a plurality of protrusions arranged around the vent hole 430. For example, the plurality of protrusions may include a first protrusion 610 and a second protrusion 620 spaced apart from each other. According to an embodiment, the plurality of protrusions may include a first protrusion 610, a second protrusion 620, and a third protrusion 630 spaced apart from each other. According to an embodiment, the plurality of protrusions may include a first protrusion 610, a second protrusion 620, a third protrusion 630, and a fourth protrusion 640 spaced apart from each other. According to an embodiment, the plurality of protrusions may be formed in the same shape or different shapes. However, the number of the protrusions is not limited thereto, and one or five or more protrusions may be provided.

According to an embodiment, the first protrusion 610 and the second protrusion 620 arranged around the vent hole 430 may be formed on one surface facing in the first direction +Z, project to the internal space S, and be spaced apart from each other.

According to an embodiment, the first protrusion 610 may include a front surface 615 facing in the first direction +Z and a plurality of side surfaces facing the internal space S. For example, at least some of the plurality of side surfaces may have different sizes and different shapes. At least a portion of a first-first side surface 611 of the first protrusion 610 may be formed in the direction towards the central axis O of the vent hole 430. An end of the first-first side surface 611 may extend to a first-second side surface 612, and the other end may extend to a first-third side surface 613 and be curved. A designated angle between the first-third side surface 613 and the first-second side surface 612 around the central axis O of the vent hole 430 may be formed. For example, the designated angle may be an acute angle. As an example, when viewed from above the back plate 422, the first protrusion 610 may be shaped as a triangle or fan.

According to an embodiment, the second protrusion 620 spaced apart from the first protrusion 610 may include a front surface 625 facing in the first direction +Z and a plurality of side surfaces facing the internal space S. At least a portion of a second-first side surface 621 of the second protrusion 620 may be formed in the direction towards the central axis O of the vent hole 430. An end of the second-first side surface 621 may extend to a second-second side surface 622, and the other end may extend to a second-third side surface 623 and be curved. A designated angle between the second-third side surface 623 and the second-second side surface 622 around the central axis O of the vent hole 430 may be formed. For example, the designated angle may be an acute angle. As an example, when viewed from above the back plate 422, the second protrusion 620 may be shaped as a triangle or fan.

According to an embodiment, the first-first side surface 611 and the second-first side surface 612 may be spaced apart from each other around the central axis O of the vent hole 430. The minimum distance (e.g., a first designated distance (e.g., the first designated distance D1 of FIG. 10)) between the first-first side surface 611 and the second-first side surface 612 crossing the central axis O of the vent hole 430 may be smaller than the diameter of the vent hole 430.

According to an embodiment, the third protrusion 630 and the fourth protrusion 640 may be disposed between the first protrusion 610 and the second protrusion 620. For example, the third protrusion 630 may be disposed in an area adjacent to the first-second side surface 612 of the first protrusion 610, and the fourth protrusion 640 may be disposed in an area adjacent to the first-third side surface 613 of the first protrusion 610. At least a portion of a side surface (e.g., the first-second side surface 612) of the first protrusion 610 and at least a portion of the side surface 633 of the third protrusion 630 may face each other, and the minimum distance between the two side surfaces 612 and 633 may be smaller than the diameter of the sound absorbing material. The description of the structure of the first protrusion 610 may apply to the third protrusion 630 and the fourth protrusion 640. The description of the arrangement between the first protrusion 610 and the second protrusion 620 may apply to the arrangement between the third protrusion 630 and the fourth protrusion 640.

Figure 10:
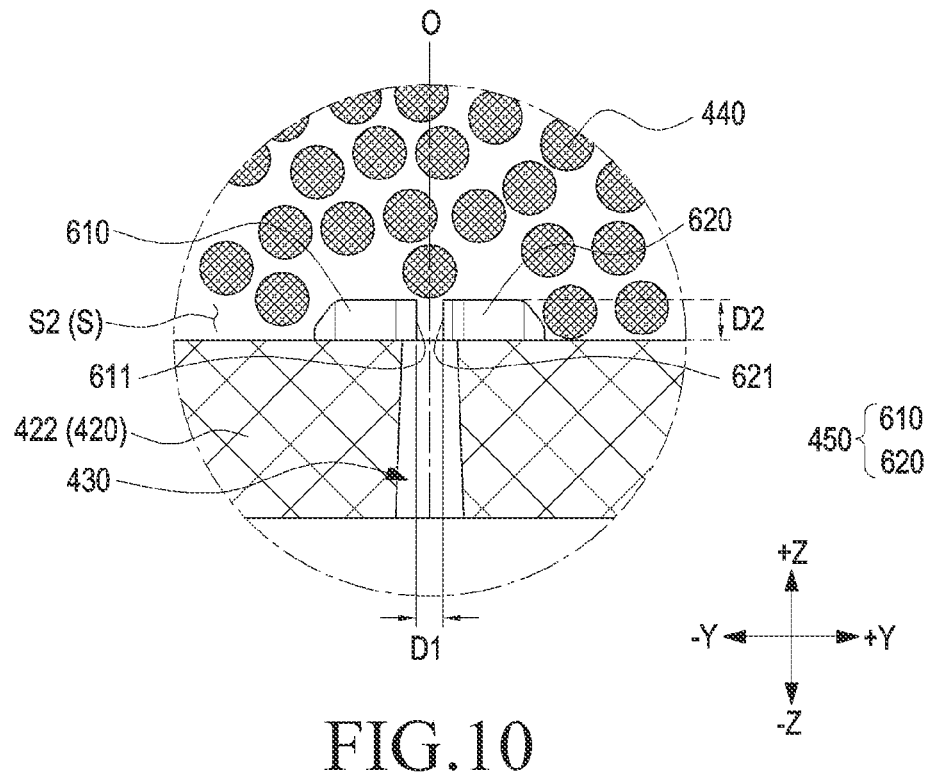
FIG. 10 is a cross-sectional view illustrating a guide structure and vent hole of an example speaker module according to various embodiments.

FIG. 10 is a cross-sectional view illustrating a guide structure and vent hole of an example speaker module according to various embodiments.

The speaker housing 420, vent hole 430, sound absorbing material 440, and guide structure 450 of the speaker module (e.g., the speaker module 400 of FIG. 5) shown in FIG. 10 may be wholly or partially identical in configuration to the speaker housing 420, vent hole 430, sound absorbing material 440, and guide structure 450 of the speaker module 400 shown in FIGS. 8 and 9.

In the 2-axis rectangular coordinate system of FIG. 10, 7 may refer, for example, to the thickness direction of the speaker module 400, and 'Y' may refer, for example, to the lengthwise direction of the speaker module 400. According to an embodiment, 'Z' may refer, for example, to a first direction (a +Z axis direction, hereinafter "+Z") or a second direction (a −Z axis direction, hereinafter "−Z"), and 'Y' may refer, for example, to a third direction (a +Y axis direction or a −Y axis direction, hereinafter "+Y" or "−Y").

According to an embodiment, the vent hole 430 may be formed through a portion of the lower structure 520 of the speaker housing 420. For example, the vent hole 430 may be disposed in the second area partitioned from the first area where the speaker component (e.g., the speaker component 410 of FIG. 5) is disposed and may be formed through at least a portion of the back plate (e.g., the back plate 422 of FIG. 5) facing in the second direction −Z of the speaker housing 420.

According to an embodiment, there may be provided a sound absorbing material 440 of particles in the second area S2 of the speaker housing 420.

According to an embodiment, the guide structure 450 may include a plurality of protrusions arranged around the vent hole 430. For example, the plurality of protrusions may include a first protrusion 610 and a second protrusion 620 spaced apart from each other, around the central axis O of the vent hole 430. The spacing may connect to the vent hole 430, providing a path for air circulation.

According to an embodiment, the first-first side surface 611 of the first protrusion 610 and the second-first side surface 621 of the second protrusion 620 may be disposed to face each other, with the central axis O of the vent hole 430 disposed therebetween. The first-first side surface 611 and the second-first side surface 621 may be spaced apart from each other at, at least, a first designated distance D1. The first designated distance D1 may be smaller than the minimum diameter of the vent hole 430. As an example, the first designated distance D1 may be designed to be smaller than the diameter of the sound absorbing material 440 particles so as to prevent the sound absorbing material 440 from directly contacting or colliding with the vent hole 430.

According to an embodiment, the length (e.g., height), in the first direction +Z, of the first protrusion 610 and/or the length (e.g., height), in the first direction +Z, of the second protrusion 620 may be a second designated distance D2. The second designated distance D2 may be designed to be longer than a half of the diameter of the sound absorbing material 440 particles.

Although the spacing and height of the first protrusion 610 and the second protrusion 620 have been limited in the above embodiment, embodiments of the disclosure are not limited thereto but various design or shape changes may be made thereto so as to prevent collisions between the sound absorbing material 440 and the vent hole 430 while enabling efficient air circulation.

Figure 11:
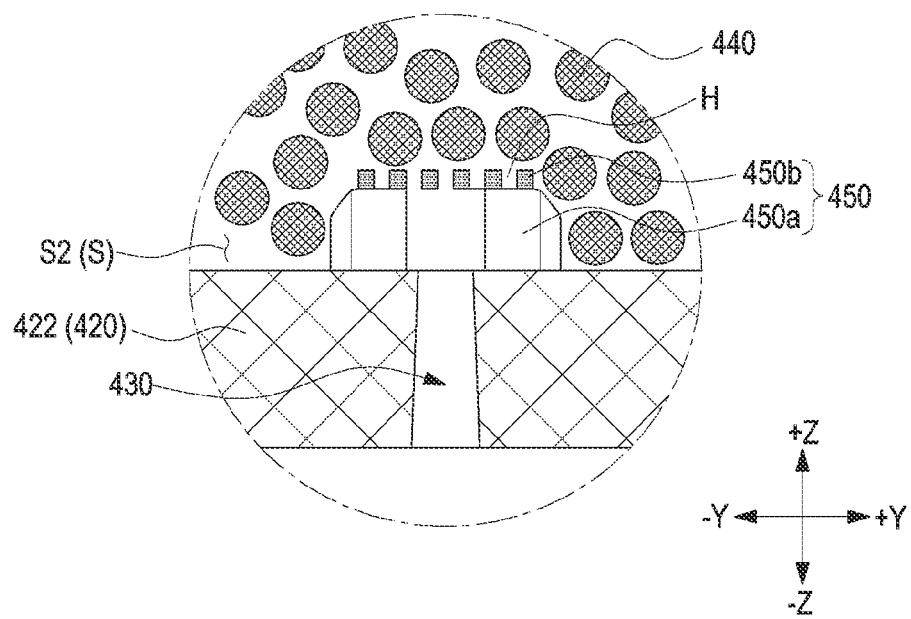
FIG. 11 is a cross-sectional view illustrating a guide structure and vent hole of an example speaker module according to various embodiments.

FIG. 11 is a cross-sectional view illustrating a guide structure and vent hole of an example speaker module according to various embodiments.

The speaker housing 420, vent hole 430, sound absorbing material 440, and guide structure 450 of the speaker module (e.g., the speaker module 400 of FIG. 5) shown in FIG. 10 may be wholly or partially identical in configuration to the speaker housing 420, vent hole 430, sound absorbing material 440, and guide structure 450 of the speaker module 400 shown in FIGS. 8 and 9.

In the 2-axis rectangular coordinate system of FIG. 11, 'Z' may refer, for example, to the thickness direction of the speaker module 400, and 'Y' may refer, for example, to the lengthwise direction of the speaker module 400. According to an embodiment, 'Z' may refer, for example, to a first direction (a +Z axis direction, hereinafter "+Z") or a second direction (a −Z axis direction, hereinafter "−Z"), and 'Y' may refer, for example, to a third direction (a +Y axis direction or a −Y axis direction, hereinafter "+Y" or "−Y").

According to an embodiment, the vent hole 430 may be formed through a portion of the lower structure 520 of the speaker housing 420. According to an embodiment, sound absorbing materials 440 of particles may be provided in the second area S2 of the speaker housing 420.

According to an embodiment, the guide structure 450 may include at least one protrusion 450a disposed around the vent hole 430 and a blocking member 450b disposed on a front surface facing in the first direction +Z of the at least one protrusion 450a.

According to an embodiment, the at least one protrusion 450a may be designed to have a height not less than a predetermined thickness around the vent hole 430, preventing the sound absorbing material 440 from directly contacting or colliding with the vent hole 430. The blocking member 450b may include a plurality of through holes H and be shaped to correspond to the shape of the front surface of the protrusion 450a. The plurality of through holes H may be designed so that a plurality of conduits facing in the direction perpendicular to or parallel with the back plate 422 spatially connect to the vent hole 430, thereby providing efficient air circulation. Each of the plurality of through holes H may be designed to be smaller than the diameter of the sound absorbing material 440 particles, preventing the sound absorbing material 440 from blocking the air circulation path of the vent hole 430.

According to an embodiment, the blocking member 450b may be formed of or include an elastic member (e.g., at least one of sponge, rubber, polymer (polycarbonate (PC) or polyethylene terephthalate (PET)), silicone, foam, or membrane), minimizing the noise generated when the sound absorbing material 440 collides with an area of the blocking member 450b.

Figure 12:
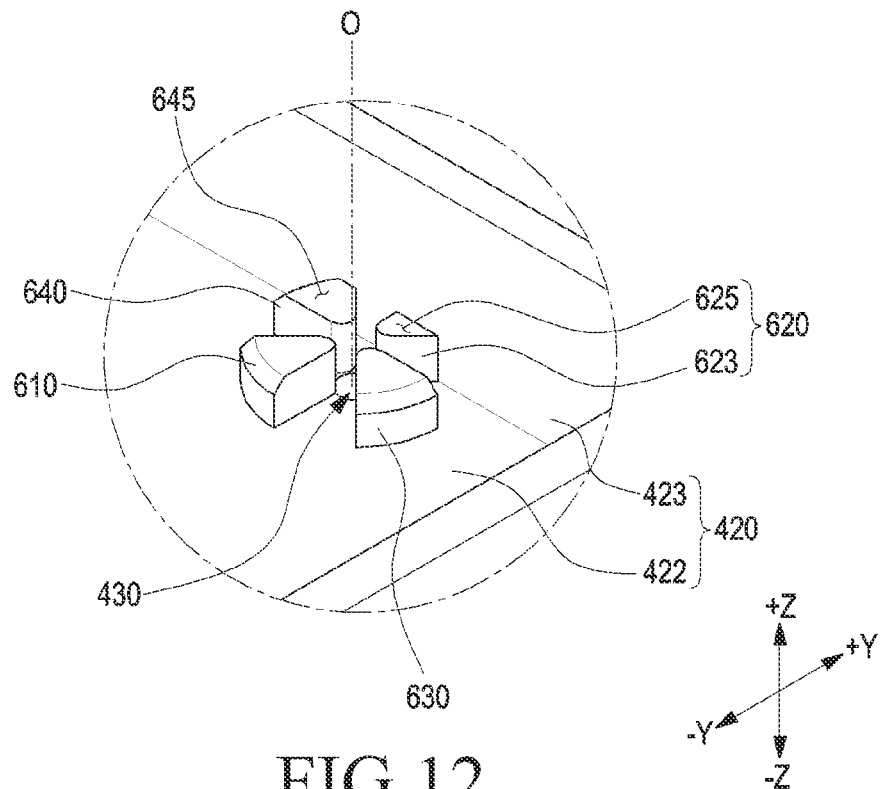
FIG. 12 is a perspective view illustrating various shapes of a guide structure and vent hole of an example speaker module according to various embodiments.

FIG. 12 is a perspective view illustrating various shapes of a guide structure and vent hole of an example speaker module according to an embodiment.

According to an embodiment, a speaker module (e.g., the speaker module 400 of FIG. 5) may include a speaker housing 420, a vent hole 430 formed through at least a portion of the speaker housing 420, and a guide structure 450 disposed to surround the vent hole 430 and at least partially projecting to the internal space S of the speaker housing 420.

The speaker module 400 of FIG. 12 may include the configurations of the speaker housing 420, vent hole 430, and guide structure 450, and each configuration may be wholly or partially identical to a respective one of the configurations of the speaker housing 420, vent hole 430, and guide structure 450 of the speaker module 400 of FIGS. 8 and 9. The following description focuses primarily on the differences.

Referring to FIG. 12, to increase the mounting efficiency of the electronic device 101 and the freedom of internal design in the speaker module 400, the vent hole 430 may be disposed adjacent to the edge of the speaker housing 420. The vent hole 430 formed through an edge portion of the back plate 422 and the guide structure 450 disposed therearound may be structurally deformed, in part, by the side surface plate 423 of the speaker housing 420, unlike in the structure of FIG. 9. For example, some protrusions of the guide structure 450 may be formed as if portions have been cut off by the side surface plate 423.

According to an embodiment, the guide structure 450 may include a plurality of protrusions arranged around the vent hole 430. For example, the guide structure 450 may include a first protrusion 610, a second protrusion 620, a third protrusion 630, and a fourth protrusion 640 spaced apart from each other.

According to an embodiment, the respective side surface portions of the first protrusion 610 and the second protrusion 620 may be disposed to face each other, and the respective side surface portions of the third protrusion 630 and the fourth protrusion 640 may be disposed to face each other.

According to an embodiment, the first protrusion 610 of FIG. 12 may be implemented in the same or similar shape to the first protrusion 610 of FIG. 8. The second protrusion 620 may include a front surface 625 facing in the first direction +Z and a plurality of side surfaces facing the internal space S. For example, at least one (e.g., a second-third side surface 623) of the plurality of side surfaces may be formed in a shape contacting the side surface plate 423 (e.g., the inner side surface). According to an embodiment, the second protrusion 620 may be formed of a rib projecting from the side surface plate 423 in the third direction −Y.

According to an embodiment, the second protrusion 620 may be formed to contact the bottom surface of the back plate 422 of the speaker housing 420 facing in the first direction +Z and the inner side surface of the side surface plate 423 of the speaker housing 420 facing in the third direction −Y which is perpendicular to the first direction +Z.

According to an embodiment, the second protrusion 620 may extend from an area adjacent to the vent hole 430, abutting the side surface plate 423. For example, as compared with the first protrusion 610, the second protrusion 620 may be formed as if the shape of the area adjacent to the side surface plate 423 is cut into by the side surface plate 423.

According to an embodiment, the shape of the second protrusion 620 may apply to the shape of the fourth protrusion 640 adjacent to the side surface plate 423. For example, the fourth protrusion 640 may include a front surface 645 facing in the first direction +Z and a plurality of side surfaces facing the internal space S. At least one of the plurality of side surfaces may be formed in a shape contacting the side surface plate 423. According to an embodiment, the fourth protrusion 640 may be formed of a rib projecting from the side surface plate 423 in the third direction −Y.

Figure 13:
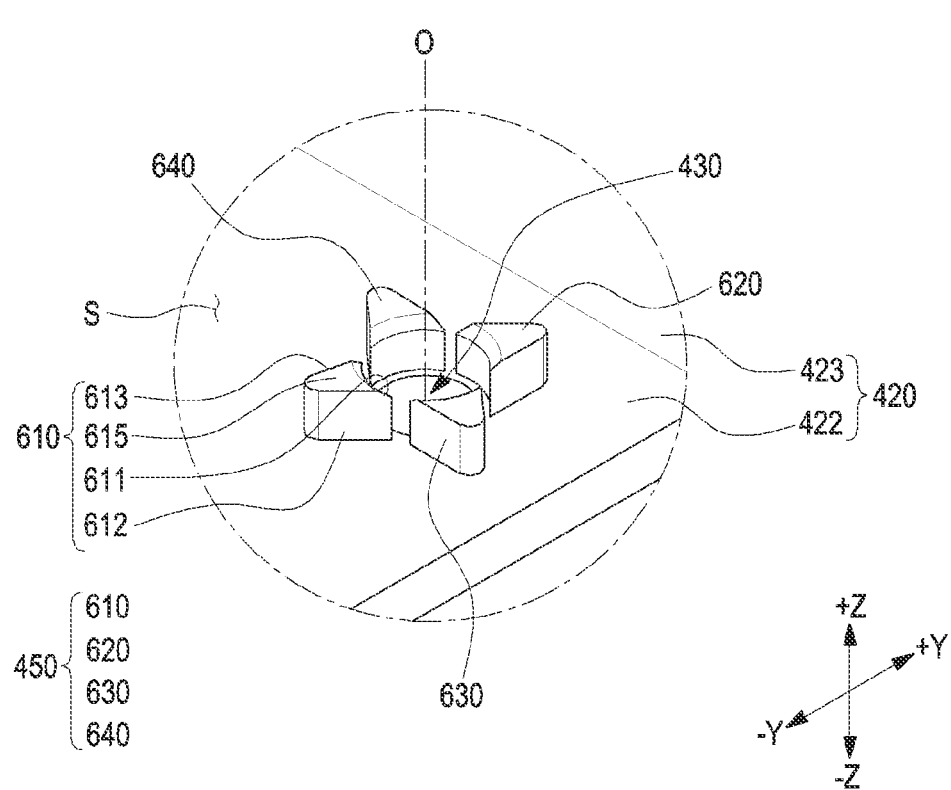
FIGS. 13, 14, and 15 are perspective views illustrating various shapes of guide structures of an example speaker module according to various embodiments.
Figure 14:
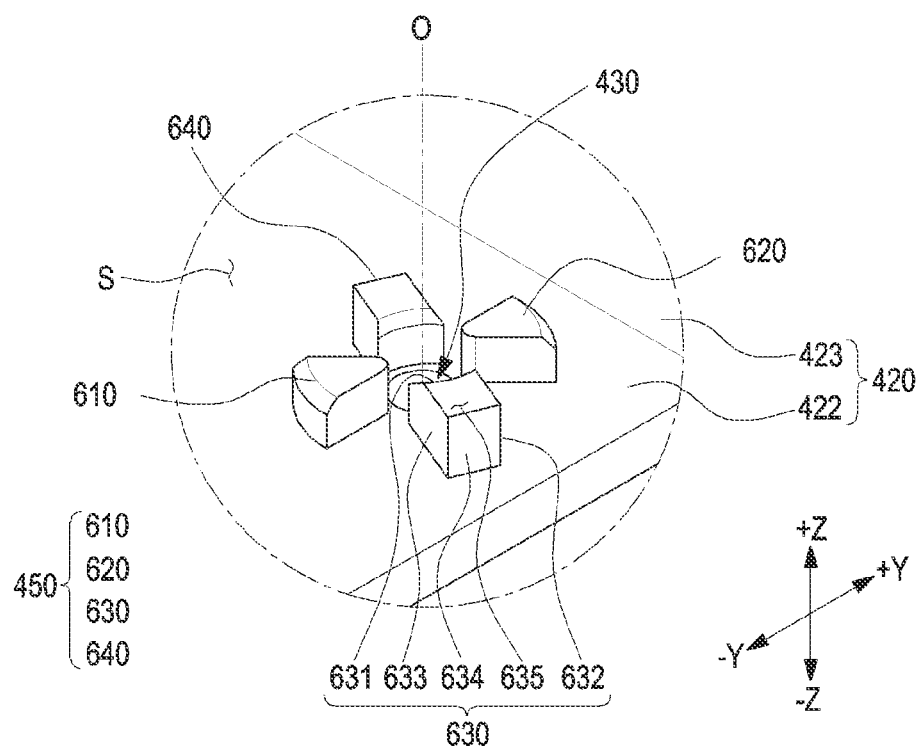
Figure 15:
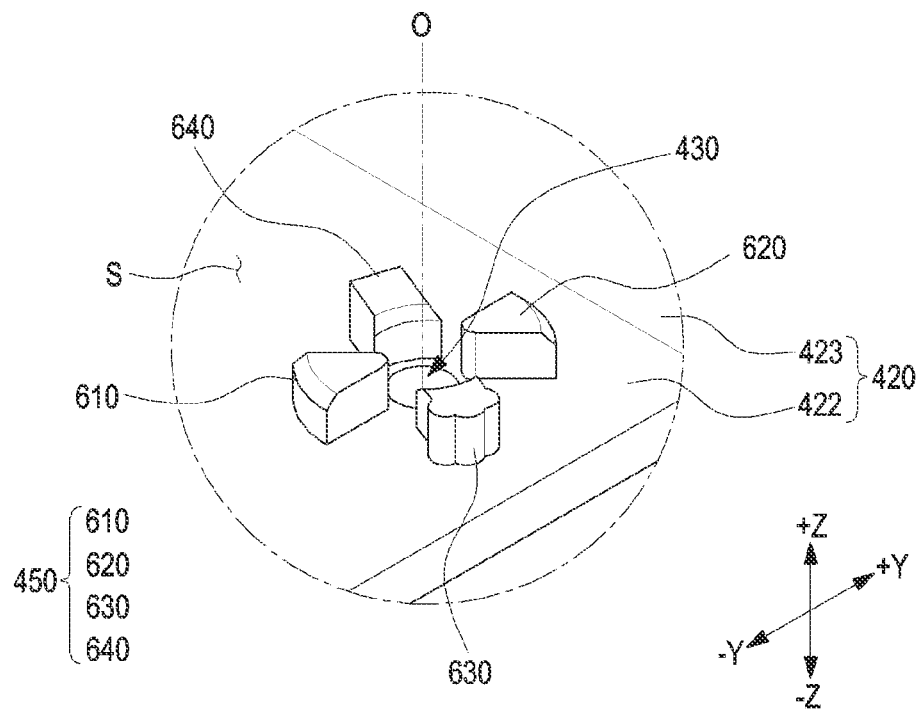

FIGS. 13, 14, and 15 are perspective views illustrating various shapes of guide structures of an example speaker module according to various embodiments.

According to an embodiment, a speaker module (e.g., the speaker module 400 of FIG. 5) may include a speaker housing 420, a vent hole 430 formed through at least a portion of the speaker housing 420, and a guide structure 450 disposed to surround the vent hole 430 and at least partially projecting to the internal space S of the speaker housing 420.

The speaker module 400 of FIGS. 13, 4, and 15 may include the configurations of the speaker housing 420, speaker component 410, vent hole 430, and guide structure 450, and each configuration may be wholly or partially identical to a respective one of the configurations of the speaker housing 420, speaker component 410, vent hole 430, and guide structure 450 of the speaker module 400 of FIGS. 8 and 9. The following description focuses primarily on the differences from the guide structure of FIG. 8.

According to an embodiment, the guide structure 450 may include a plurality of protrusions arranged around the vent hole 430. For example, the guide structure 450 may include a first protrusion 610, a second protrusion 620, a third protrusion 630, and a fourth protrusion 640 spaced apart from each other.

Referring to FIG. 13, the first protrusion 610 and the second protrusion 620 arranged around the vent hole 430 may be formed on one surface facing in the first direction +Z, project to the internal space S, and be spaced apart from each other.

According to an embodiment, the first protrusion 610 may include a front surface 615 facing in the first direction +Z and a plurality of side surfaces facing the internal space S. For example, at least some of the plurality of side surfaces may have different sizes and different shapes. At least a portion of a first-first side surface 611 of the first protrusion 610 may be formed in the direction towards the central axis O of the vent hole 430. An end of the first-first side surface 611 may extend to a first-second side surface 612, and the other end may extend to a first-third side surface 613. The front surface 615 of the first protrusion 610 may narrow away from the central axis O of the vent hole 430. As an example, when viewed from above the back plate 422, the first protrusion 610 of FIG. 13 has the left-right inverted shape of the first protrusion 610 of FIG. 9.

According to an embodiment, the second protrusion 620 may be disposed to face the first protrusion 610 with the central axis O of the vent hole 430 disposed therebetween, and the third protrusion 630 and the fourth protrusion 640 may be disposed to face each other with the central axis O of the vent hole 430 disposed therebetween. The shape of the first protrusion 610 may apply to the shape of the second protrusion 620, third protrusion 630, and fourth protrusion 640 of FIG. 13.

Referring to FIG. 14, the first protrusion 610 and the second protrusion 620 arranged around the vent hole 430 may be formed on one surface facing in the first direction +Z, project to the internal space S, and be spaced apart from each other.

According to an embodiment, the first protrusion 610 and the second protrusion 620 may be wholly or partially identical in structure to the first protrusion 610 and the second protrusion 620 of FIG. 8. The third protrusion 630 and the fourth protrusion 640 may be formed in shapes corresponding to each other. The third protrusion 630 is described below, and the description may apply to the fourth protrusion 640.

According to an embodiment, the third protrusion 630 may be disposed apart between the first protrusion 610 and the second protrusion 620 and may include a first surface 635 facing in the first direction +Z and a plurality of side surfaces facing the internal space S. A third-first side surface 631 of the third protrusion 630 may be formed to at least partially face the central axis O of the vent hole 430 and may be formed as a curved surface corresponding to the shape of the vent hole 430. As an example, the other side surfaces 632, 633, and 634 than the third-first side surface of the third protrusion 630 may be formed in directions perpendicular to each other.

According to an embodiment, the third protrusion 630 may be shaped substantially as a cuboid and, when viewed from above the back plate 422, the third protrusion 630 may look rectangular.

Referring to FIG. 15, the first protrusion 610, second protrusion 620, and fourth protrusion 640 arranged around the vent hole 430 may be wholly or partially identical in structure to the first protrusion 610, second protrusion 620, and fourth protrusion 640 of FIG. 14.

According to an embodiment, the third protrusion 630 may be spaced apart between the first protrusion 610 and the second protrusion 620, and the third protrusion 630 may face the fourth protrusion 640 and be formed in a different shape.

The third protrusion 630 may include a side surface facing the vent hole 430 and other side surfaces which are partially curved or flat.

According to various embodiments, various shapes of protrusions included in the guide structure 450 are shown. However, embodiments of the disclosure are not limited thereto. For example, more protrusions may be formed or various shape changes may be made depending on the internal space S of the speaker module 400.

According to an embodiment, a speaker module (e.g., 400 of FIG. 5) comprises a speaker housing (e.g., 420 of FIG. 5) including a conduit (e.g., 424 of FIG. 5) extending to an internal space (e.g., S of FIG. 5), a speaker component 410 positioned in a first area S1 of the internal space adjacent to the conduit, a vent hole (e.g., 430 of FIG. 5) spaced apart from the speaker component and passing through at least part of the speaker housing, a sound absorbing material (e.g., 440 of FIG. 5) disposed in a second area (S2 of FIG. 5) of the internal space to be positioned adjacent to the speaker component to absorb a sound generated from the speaker component, and a guide structure (e.g., 450 of FIG. 5) disposed to surround the vent hole and including at least one protrusion (e.g., 450a of FIG. 5) protruding towards the internal space.

According to an embodiment, the sound absorbing material may include a plurality of particles and be prevented from contacting the vent hole by the guide structure formed around the vent hole.

According to an embodiment, the vent hole may be formed in the second area of the internal space, partitioned from the first area.

According to an embodiment, the guide structure may include a first protrusion (e.g., 610 of FIG. 8) and a second protrusion (e.g., 620 of FIG. 8) spaced apart from each other. A distance between the first protrusion and the second protrusion crossing a central axis (e.g., O of FIG. 8) of the vent hole may be smaller than a diameter of the sound absorbing material.

According to an embodiment, the guide structure may include a first protrusion (e.g., 610 of FIG. 8) and a second protrusion (e.g., 630 of FIG. 8) disposed adjacent to and apart from each other. A first side surface (e.g., the first-second side surface 612 of FIG. 8) of the first protrusion may face a second side surface (e.g., 633 of FIG. 8) of the second protrusion. A minimum distance between the first side surface and the second side surface may be smaller than a diameter of the sound absorbing material.

According to an embodiment, the guide structure may include a first protrusion with a designated thickness. The thickness of the first protrusion may be larger than a half of a diameter of the sound absorbing material.

According to an embodiment, the guide structure may further include a third protrusion disposed between the first protrusion and the second protrusion. The third protrusion may be formed in a different shape than the first protrusion and the second protrusion.

According to an embodiment, the guide structure (e.g., 450 of FIG. 11) may further include a blocking member (e.g., 450b of FIG. 8) disposed on a front surface of the at least one protrusion and including a plurality of through holes (e.g., H of FIG. 11).

According to an embodiment, the plurality of through holes of the blocking member may be formed to face in a direction perpendicular to or parallel with the vent hole. At least some of the plurality of through holes may be connected together and provide an air ventilation path towards the vent hole.

According to an embodiment, the blocking member may include an elastic member.

According to an embodiment, the guide structure may further include a fourth protrusion disposed between the first protrusion and the second protrusion and facing at least one side surface of the third protrusion with the vent hole disposed therebetween.

According to an embodiment, the first protrusion, second protrusion, third protrusion, and fourth protrusion of the guide structure may be formed in shapes corresponding to each other.

According to an embodiment, at least one of the first protrusion, second protrusion, third protrusion, and fourth protrusion of the guide structure may be formed in a shape different from the other protrusions.

According to an embodiment, the first protrusion (e.g., 620 of FIG. 12) or second protrusion (e.g., 640 of FIG. 12) of the guide structure may be disposed in contact with a bottom surface (e.g., the inner side surface of the back plate 422 of FIG. 12) facing in a first direction (e.g., +Z of FIG. 12) of the speaker housing and an inner side surface (e.g., the inner side surface of the side surface plate 423 of FIG. 12) facing in a second direction (e.g., -Y of FIG. 12) perpendicular to the first direction.

According to an embodiment, an electronic device comprises a housing (e.g., 310 of FIG. 2 or 3) including a front plate (e.g., 320 of FIG. 4), a back plate (e.g., 380 of FIG. 4), and a side surface member (e.g., 331 and 332 of FIG. 4) surrounding a first space between the front plate and the back plate and including a first conduit (e.g., 307 of FIGS. 2 and 3) extending through to an outside, a display (e.g., 330 of FIG. 4) configured to output a screen via the front plate, a battery (e.g., 350 of FIG. 4) disposed between the display and the back plate, a speaker module (e.g., 400 of FIG. 4) disposed in the first space and including a second conduit connected with the first conduit, and a printed circuit board (e.g., 340 of FIG. 4) disposed adjacent to the speaker module and electrically connected with the speaker module. The speaker module may include a speaker housing (e.g., 420 of FIG. 5) forming a second space (e.g., S of FIG. 5) partitioned from the first space, a speaker component positioned adjacent to the second conduit (e.g., 424 of FIG. 5), in a first area (e.g., S1 of FIG. 5) of the second space, a vent hole (e.g., 430 of FIG. 5) spaced apart from the speaker component and passing through at least part of the speaker housing to the first space, a sound absorbing material (e.g., 440 of FIG. 5) disposed in a second area (e.g., S2 of FIG. 5) of the second space to be positioned adjacent to the speaker component to absorb a sound generated from the speaker component, and a guide structure (e.g., 450 of FIG. 5) disposed to at least partially surround the vent hole and including at least one protrusion (e.g., 450a of FIG. 5) protruding towards the second space.

According to an embodiment, the sound absorbing material may include a plurality of particles and be prevented from contacting the vent hole by the guide structure formed around the vent hole.

According to an embodiment, the guide structure may be integrally formed with the speaker housing and include an opening formed in a front surface or a side surface and extending to the vent hole.

According to an embodiment, the guide structure may include a first protrusion and a second protrusion spaced apart from each other. A distance between the first protrusion and the second protrusion crossing a central axis of the vent hole may be smaller than a diameter of the sound absorbing material.

According to an embodiment, the guide structure may include a first protrusion and a second protrusion disposed apart from each other. A first side surface of the first protrusion may face a second side surface of the second protrusion. A minimum distance between the first side surface and the second side surface may be smaller than a diameter of the sound absorbing material.

According to an embodiment, the guide structure may further include a third protrusion disposed between the first protrusion and the second protrusion and a fourth protrusion spaced apart from the third protrusion, with the vent hole disposed therebetween.

As is apparent from the foregoing description, according to various embodiments, the speaker module of the electronic device may secure an efficient mounting space in the electronic device by making design changes to the structure, rather than by use of a separate member, e.g., sponge, which may pose limitations on designing.

According to various embodiments, the speaker module of the electronic device may include a guide structure formed to surround the vent hole, thereby removing noise around the vent hole while achieving smooth air circulation.

According to various embodiments, the speaker module of the electronic device has a guide structure integrally formed with the speaker housing, allowing for cost savings, process simplification, and better sound quality.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A speaker module, comprising:
   a speaker housing including an internal space and a conduit adjacent to the internal space and extending to the internal space, and the internal space including a first region and a second region partitioned from the first region;
   a speaker component positioned in the first region;
   a vent hole spaced apart from the speaker component and passing through at least part of the speaker housing corresponding to the second region of the internal space;
   a sound absorbing material disposed in the second region to be positioned adjacent to the speaker component; and
   a guide structure disposed to surround the vent hole and including at least one protrusion protruding towards the internal space,
   wherein the guide structure includes a plurality of openings formed in a front surface of the guide structure and a side surface of the guide structure and extending to the vent hole.

2. The speaker module of claim 1, wherein the sound absorbing material comprises a plurality of particles and is prevented from contacting the vent hole by the guide structure formed around the vent hole.

3. The speaker module of claim 2, wherein the guide structure includes a first protrusion and a second protrusion spaced apart from each other, and wherein a distance between the first protrusion and the second protrusion crossing a central axis of the vent hole is smaller than a particle diameter of the sound absorbing material.

4. The speaker module of claim 2, wherein the guide structure includes a first protrusion and a second protrusion disposed adjacent to and apart from each other,
   wherein a first side surface edge of the first protrusion faces a second side surface edge of the second protrusion, and wherein a minimum distance between the first side surface and the second side surface is smaller than a particle diameter of the sound absorbing material.

5. The speaker module of claim 2, wherein the guide structure includes a first protrusion, and wherein a thickness of the first protrusion is larger than a half of a particle diameter of the sound absorbing material.

6. The speaker module of claim 3, wherein the guide structure further includes a third protrusion disposed between the first protrusion and the second protrusion, and
   wherein the third protrusion has different shape different from the first protrusion and the second protrusion.

7. The speaker module of claim 6, wherein the guide structure further includes a fourth protrusion disposed between the first protrusion and the second protrusion and facing at least one side surface of the third protrusion with the vent hole disposed therebetween.

8. The speaker module of claim 7, wherein the first protrusion, second protrusion, third protrusion, and fourth protrusion of the guide structure have shapes corresponding to each other.

9. The speaker module of claim 7, wherein at least one of the first protrusion, second protrusion, third protrusion, or fourth protrusion of the guide structure have a shape different from the other protrusions.

10. The speaker module of claim 3, wherein the first protrusion or second protrusion of the guide structure is disposed in contact with a bottom surface facing in a first direction of the speaker housing and an inner side surface facing in a second direction perpendicular to the first direction.

11. The speaker module of claim 1, wherein the guide structure further includes a blocking member disposed on a front surface of the at least one protrusion and including a plurality of through holes, and
    wherein the plurality of through holes of the blocking member face in a direction perpendicular to or parallel with the vent hole, and wherein at least some of the plurality of through holes are connected together and provide an air ventilation path towards the vent hole.

12. An electronic device, comprising:
    a device housing including a front plate, a back plate, and a side surface member surrounding a first space between the front plate and the back plate and including a first conduit extending to an outside;
    a display configured to output a screen via the front plate;
    a battery disposed between the display and the back plate;
    a speaker module disposed in the first space and including a second conduit in communication with the first conduit; and
    a printed circuit board (PCB) disposed adjacent to the speaker module and electrically connected with the speaker module, wherein the speaker module includes:
    a speaker housing forming a second space partitioned from the first space, wherein the second space includes a first region and a second region partitioned from the first region;
    a speaker component positioned adjacent to the second conduit, in the first region;

a vent hole spaced apart from the speaker component and passing through at least part of the speaker housing corresponding to the second region to the first space of the housing;

a sound absorbing material disposed in the second region to be positioned adjacent to the speaker component; and a guide structure disposed to at least partially surround the vent hole and including at least one protrusion protruding towards the second space, wherein the guide structure includes a plurality of openings formed in a front surface of the guide structure and a side surface of the guide structure and extending to the vent hole.

13. The electronic device of claim 12, wherein the sound absorbing material comprises a plurality of particles and is prevented from contacting the vent hole by the guide structure formed around the vent hole.

14. The electronic device of claim 13, wherein the guide structure is integrally formed with the speaker housing.

* * * * *